US006457137B1

United States Patent
Mitchell et al.

(10) Patent No.: US 6,457,137 B1
(45) Date of Patent: Sep. 24, 2002

(54) METHOD FOR CONFIGURING CLOCK RATIOS IN A MICROPROCESSOR

(75) Inventors: Craig G. Mitchell, Mt. Prospect; Christian A. D'Souza, Rolling Meadows; Michael P. Dempsey, Chicago, all of IL (US); Chandra S. Pandey, Lowell, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,815

(22) Filed: May 28, 1999

(51) Int. Cl.[7] .................................................. G06F 1/12
(52) U.S. Cl. .................. 713/400; 713/1; 713/500; 713/600; 709/400; 710/58
(58) Field of Search ................ 713/1, 100, 400, 713/401, 500–503, 600, 601; 709/400; 712/15; 710/50, 58, 60, 61; 714/815

(56) References Cited

U.S. PATENT DOCUMENTS

| | | | | |
|---|---|---|---|---|
| 5,070,233 A | * | 12/1991 | Takizawa et al. | 235/380 |
| 5,459,855 A | * | 10/1995 | Lelm | 713/500 |
| 5,520,359 A | * | 5/1996 | Merhav et al. | 244/158 R |
| 5,764,091 A | * | 6/1998 | Sumita et al. | 327/175 |
| 5,784,599 A | * | 7/1998 | Eilkhoury | 713/501 |
| 5,898,640 A | * | 4/1999 | Ben-meir et al. | 365/233 |
| 6,161,188 A | * | 12/2000 | Gaskins et al. | 713/501 |
| 6,175,929 B1 | * | 1/2001 | Hsu et al. | 713/500 |
| 6,212,489 B1 | * | 4/2001 | Klein et al. | 703/13 |

OTHER PUBLICATIONS

Embedded Pentium® Processor Family *Developer's Manual*, Chapter 16.10 Fractional Speed Bus, Intel®, 1998, pp. 16–218 to 16–221.
Pentium® Processor Family *Developer's Manual*, Chapter 5.1.10. Hardware Interface, BF1–0, Intel®,1997, pp. 5–17 to 5–18.

* cited by examiner

*Primary Examiner*—Jeffrey Gaffin
*Assistant Examiner*—Rijue Mai
(74) *Attorney, Agent, or Firm*—McDonnell Boehnen Hulbert & Berghoff

(57) ABSTRACT

Disclosed is a method and apparatus for software configuration of a processor clock ratio. Boot code that the processor executes in response to a reset event correctly configures the clock ratio to a desired value, where the desired value can be set via a user interface. The processor then checks the clock ratio against a desired clock ratio value stored in a nonvolatile memory. If the clock ratio is the same as the desired clock ratio value, then the processor completes the boot of the processor. If the clock ratio is different from the desired value, then the processor writes the desired value into a latch connected to the on clock configuration input terminals of the processor and inhibits reset of the latch. The processor then generates another reset event. In this reset cycle, the processor will sense the desired clock ratio value driven onto the clock configuration input terminals by the latch and boot with the desired clock ratio.

10 Claims, 3 Drawing Sheets

METHOD FOR CONFIGURING CLOCK RATIOS IN A MICROPROCESSOR

FIELD OF INVENTION

The present invention relates to microprocessors. More specifically, it relates to the configuration of a clock ratio for a microprocessor at power-up.

BACKGROUND OF THE INVENTION

Operations in a microprocessors are typically driven by a clock signal which allows the internal operations of the microprocessor to be coordinated with external events. FIG. 1 is a simplified block diagram of one embodiment of a typical microprocessor 100.

Microprocessor 100 includes an instruction cache 110 that contains microcoded instructions that control the operation of instruction sequencer 112. Sequencer 112, in turn drives the functional units of processor 100 by generating CONTROL signals onto internal control bus 140 and, when needed, outputting CONSTANTS to execution and address generator unit 144.

The CONTROL signals generated by sequencer 112 and distributed through control bus 140 control and coordinate the operation of the functional units inside processor 100. These functional units are register file 130, multiplication and division unit 142, execution and address generation unit 144, memory interface unit 146, bus control unit 170 and local data cache 180.

Register file 130 is used to store operand and result data within processor 100. Internal bus 150 represents three independent busses, first and second source busses and a destination bus, for transferring operands to the multiplication and division unit 142 and the execution and address generation unit 144 from the register file and the results of the operations of these units back to register file 130. In addition, memory interface unit 146 transfers address and data values between internal data and address bus 160 and internal source and destination bus 150 and receives address values from execution and address generation unit 144.

Bus control unit 170 coordinates the transfer of control, address and data information between internal bus 160 and external busses 30, 40 and 50. Control signals are output to units peripheral to processor 100 via control bus 30. Address values are output to peripheral units, such as memory subsystems and disc controllers, via address bus 40. Instructions and operands data are transferred into and out of processor 100 via data bus 50. The address bus 40 and data bus 50 typically interface with a system bus, such as a host bus that interfaces between the processor 100 and a chipset, such as a bus bridge or cache controller. The host bus typically operates at a different frequency from internal busses 150 and 160 that is determined by external clock signal CLK.

The external clock signal CLK is input to processor 100 via external interface pin 20. The external clock signal CLK is typically the timing signal that coordinates the activity on the external busses CONTROL BUS 30, ADDRESS BUS 40 and DATA BUS 50 that interface with processor 100. The CLK signal is input to a clock and power management unit 120 that typically multiples the frequency of the CLK signal in order to generate a higher speed internal clock signal INCLK that coordinates the activity of the function units and busses inside processor 100. The connection of INCLK to each of the function units is omitted from FIG. 1 in the interest of clarity.

The CONTROL signals generated by sequencer 112 are thus coordinated by the internal clock signal INCLK. This permits the internal operations of processor 100 to execute at a faster rate than the external events, such as data and instruction transfers via the external busses 30, 40 and 50. The ratio of the frequency of the internal clock signal INCLK to the frequency of the external clock signal CLK is the microprocessor's clock ratio. For example, with an external clock frequency for CLK of 50 MHz and a clock ratio of four, the processor will run internally at 200 MHz.

One method for the processor to determine its clock ratio is, when the processor 100 is coming out of a reset event, it will sense a set of signal lines BF0, BF1 and BF2 as clock configuration lines that determine the clock ratio of the processor. Conventionally, the values on these clock configuration lines BF0–2 are determined through the use of hardware, such as resistors or jumpers, to place the correct logic value voltages on the relevant clock configuration lines. In many processors, if these lines are left unconnected, then the clock ratio defaults to a predetermined default value, such as ½ or ⅔.

The values on the external pins BF0–2 are typically sampled at processor reset and cannot be changed until another processor reset event occurs, e.g. a reset pin of the processor is asserted. Further, the value on pins BF0–2 typically cannot be changed when reset is active. Changing the clock ratio requires that the values on pins BF0–2 be physically changed and then the processor reset. For more detailed information on a particular processor, see the Embedded Pentium Processor Family Developer's Manual from Intel at developer.intel.com/design.

This hardware approach is inflexible. Changing the clock ratio is a cumbersome and disruptive process that requires physical access to the motherboard or processor chip. In many cases, in particular embedded processor designs, there is no physical access to the clock configuration pins BF0–2 once the processor has been incorporated into a product. Therefore, the need remains for a convenient and flexible way to change the clock ratio of a processor.

SUMMARY OF THE INVENTION

In accordance with preferred embodiments of the present invention, some of the problems associated with configuring the clock ratio of a processor are overcome.

An embodiment of a method, according to the present invention, for changing the clock ratio of a processor under software control includes, responsive to reset of the processor, reading a first bit pattern present on clock ratio configuration pins of the processor and booting the processor with a clock ratio corresponding to the bit pattern present on the clock ratio configuration pins. The method then calls for comparing the clock ratio of the processor after booting to a desired clock ratio value from a non-volatile storage. Then, when the clock ratio of the processor after booting does not equal the desired clock ratio value, writing the desired value to a register coupled to the clock ratio configuration pins of the processor and inhibiting reset of the register. The method then requires resetting the processor when the clock ratio of the processor after booting does not equal the correct clock ratio value.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

The present invention is directed toward a method for configuration of a clock ratio for a processor under software control. In the present invention, the processor is configured with a default clock ratio value. BIOS code that runs on the processor after power-up of the processor checks the default value against a correct value stored in a nonvolatile memory. If the default value is correct, then the processor continues to boot the system normally.

If the default ratio is different from the correct value, then the processor writes the correct value into a latch connected to clock configuration pins of the processor that will drive the clock ratio configuration pins upon reset. The BIOS code then instructs the processor to reset without resetting the latch. In this reset cycle, the processor will sense the correct clock ratio value driven onto the clock ratio configuration pins by the latch. The processor will then boot based upon the correct clock ratio. When the correct clock ratio value is stored in memory that can be modified via the user interface, then the correct value in memory can be modified by the user in order to change the clock ratio of the processor.

Figure 1:
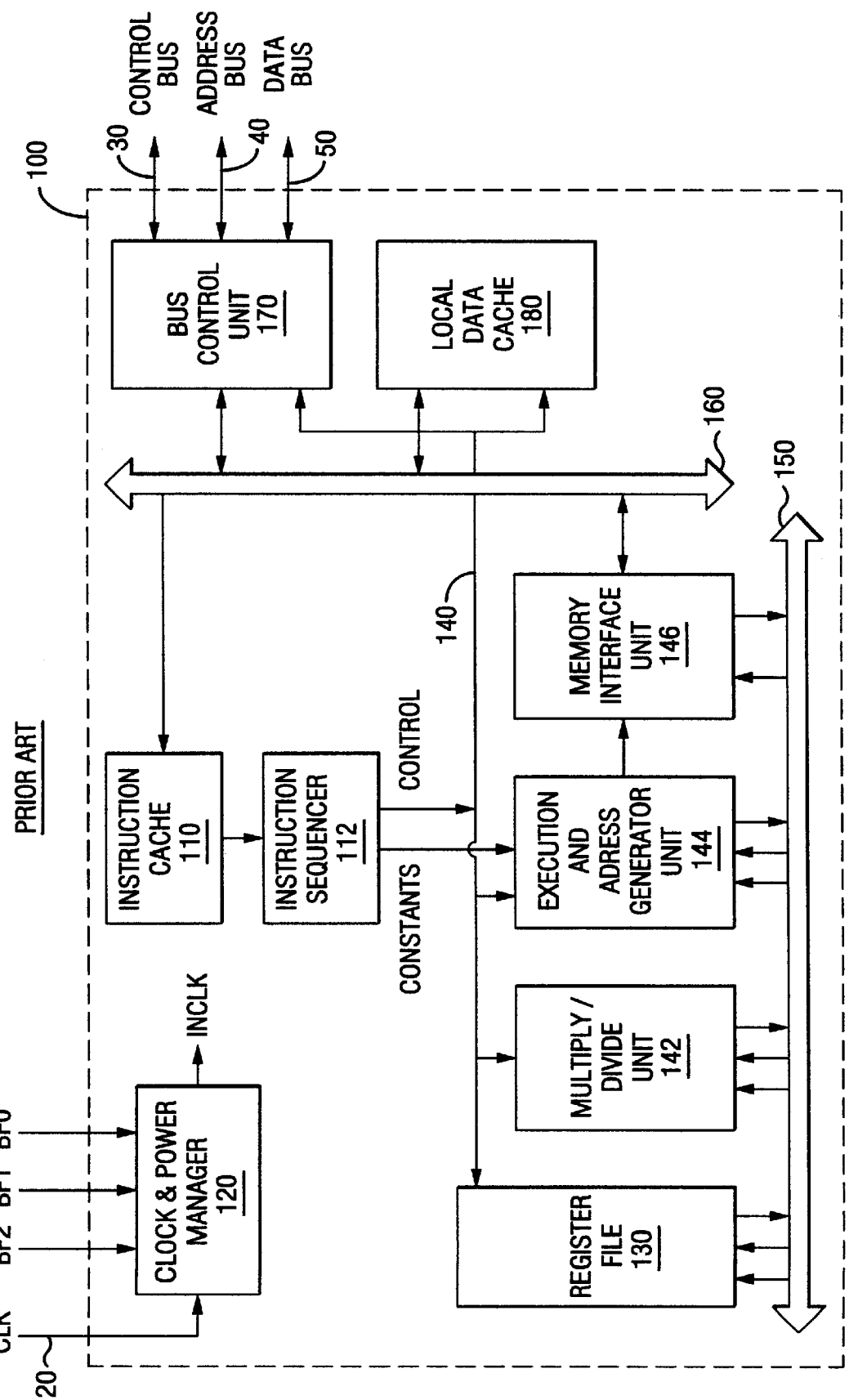
FIG. 1 is a block diagram illustrating an example of a conventional processor.
Figure 2:
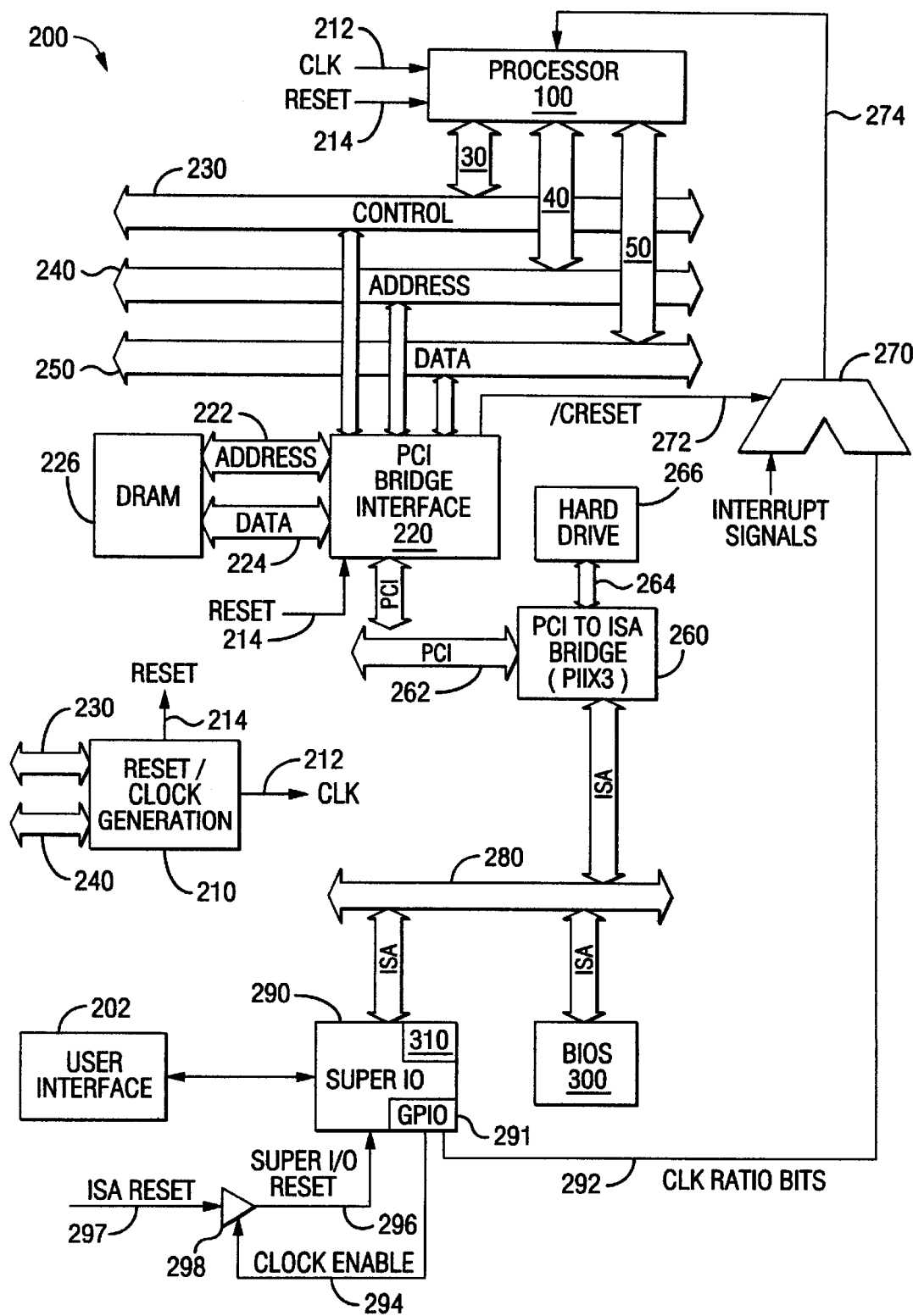
FIG. 2 is a block diagram of a processor architecture suitable for use with the present invention.

FIG. 2 illustrates a simplified computer system architecture 200 suitable for use with the present invention. The control 30, address 40 and data 50 busses are connected to system control 230, address 240, and data 250 busses for system architecture 200. System busses 230, 240 and 250, in turn, are connected to a peripheral component interconnect (PCI) bridge interface circuit 220 which interfaces the system busses to a DRAM 226, via address connection 222 and data connection 224, and a PCI bus 262. Note that PCI bridge interface circuit 220 typically consists of a set of two chips. PCI bridge interface circuit 220 translates signals between the formats and protocols of the systems busses 230, 240 and 250 and the PCI bus 262.

PCI bus 262 is connected to a PCI to Industry Standard Architecture (ISA) bridge circuit 260 that translates signals between PCI and ISA formats and protocols. PCI to ISA bridge circuit 260 interfaces with a hard drive 266 via hard drive connection 264. ISA bus 280 is also connected to PCI to ISA bridge circuit 260.

ISA bus 280 is further connected to Super Input/Output (I/O) circuit 290 and to a Basic I/O System (BIOS) storage 300. BIOS store 300 is typically read-only-memory (ROM) or a semi-permanent memory device, such as flash memory. Often a buffer is present between ISA bus 280 and BIOS 300, where the BIOS side of the buffer is typically called the X bus.

Super I/O circuit 290 includes a general purpose I/O (GPIO) register 291 that is used to drive a value for clock ratio bits BF0–2 and outputting this value onto connection 292 to multiplexor (MUX) 270. The GPIO register 291, or a second register within GPIO register 291, also drives a clock enable signal onto connection 294 to buffer 298 that inhibits an ISA reset input 297 from driving super I/O reset 296. The GPIO register contents can be modified by processor 100 by writing to it through PCI bridge interface 220 and PCI to ISA bridge 260 to super I/O circuit 290.

Super I/O circuit 290 also includes a parameter store 310 that is semi-permanent storage, such as flash memory or RAM with battery back-up, for storage of system parameters including a correct value for the processor clock ratio. Alternatively, the BIOS can be designed to include a semi-permanent parameter store for storage of system parameters and the correct value for the processor clock ratio.

Super I/O circuit 290 is also connected to a user interface 202 that provides for communication between a user and the processor 100. Typically, the user interface includes a keyboard and mouse interface. A separate PCI device is often present to provide a video interface to the user. The user can enter commands through the user interface 202 to the processor 100 that update data within the architecture 200. For example, the processor can be configured to permit the user to update the correct value for the clock ratio stored in parameter store 310 in super I/O circuit 290.

MUX 270 receives the clock ratio bits at one input via connection 292 and interrupt signals via another input. MUX 270 selects one of these input sources under control of /CRESET signal 272 from the PCI bridge interface circuit 220. When the RESET signal 214 is active, then PCI bridge 220 activates /CRESET signal 272 to select the clock ratio bits from GPIO 291 on connection 292 for output onto connection 274 to the BF0–2 pins of processor 100.

Reset and clock generation circuit 210 generates CLK signal 212 for distribution to the system busses and bridge circuits (not shown) and processor 100. The reset and clock generation circuit 210 also generates a RESET signal 214 that is input to processor 100 and that is generated upon power-up of system architecture 200. Circuit 210 is coupled to control bus 230 and address bus 240 of the architecture to allow the processor 100 to initiate a software generated reset of the architecture 200. By writing to a predetermined address corresponding to circuit 210, the processor triggers a device, such as a one-shot, that asserts the RESET signal 214 that resets the system.

Figure 3:
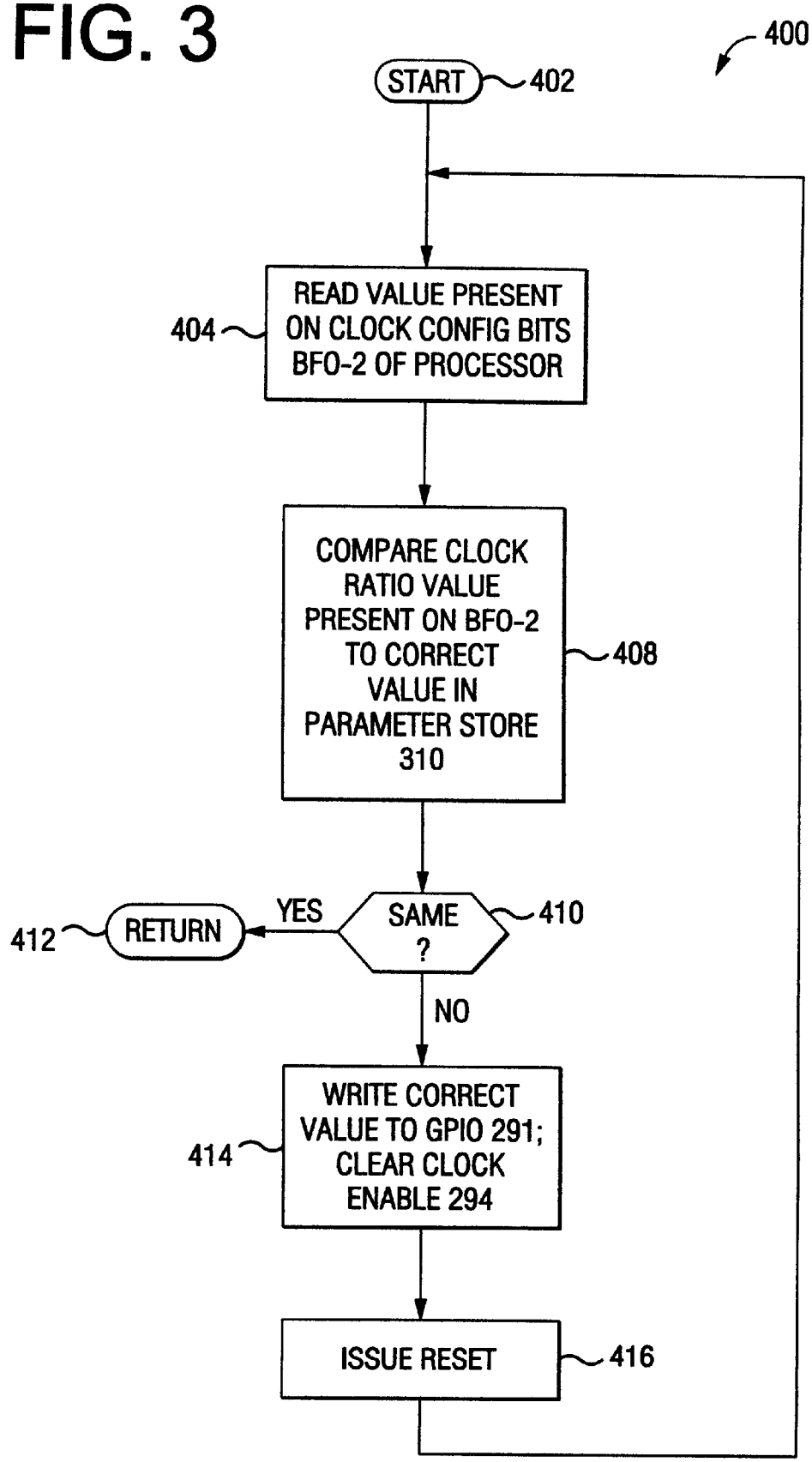
FIG. 3 is a flow diagram illustrating an embodiment of a clock configuration method according to the present invention.

FIG. 3 is a flow chart illustrating an embodiment. of a method 400 for configuring a clock ratio of a processor according to the present invention. This embodiment of method 400 represents machine readable code that is resident in BIOS 300 of FIG. 2 and which is operable to configure the clock ratio of processor 100.

In this embodiment, the default clock ratio value is set by weakly pulling up or down the clock configuration bits BF0–2 of processor 100. This is accomplished by connecting relatively high value resistors to BF0–2, i.e. to the individual bit lines of connection 274. The output of GPIO register 291 is floating during an initial reset before a value has been written into the register.

Responsive to an initial reset, e.g. a power-on reset event, processor 100 initially reads the clock configuration bits BF0–2 and boots under the control of hardware internal to the processor that initiates operation of the processor using the clock ratio indicated by the value on the clock configuration bits. The processor then initiates the routine resident in BIOS 300 which enters the flow diagram 400 at step 402.

The term boot, as is well known in the art, refers to a process in a device designed to bring itself into a state where it can operate on its own. For example, a typical boot routine can consist of a small set of instructions that operate to start a computer by bringing the rest of a much larger process from a peripheral device into the memory for a processor from which the processor continues to execute. The small set of instructions typically resides in a read only memory (ROM) and the processor is configured to execute these instructions in response to a reset event. A reset event restores a computer or device to a known state. Typically, most devices will perform a power-on reset when power is introduced to the machine in order to initialize operation of the computer to a known state.

Returning to FIG. 3, at step 404, the value present on clock configuration bits BF0–2 of the processor is read by the routine resident in BIOS 300. This can also be accomplished by reading the output value of GPIO register 291. Then, at step 408, the default clock ratio value used to boot processor 100, e.g. the clock ratio value read from bits BF0–2, is compared to the desired correct value stored in parameter store 310 of super I/O circuit 290.

If the clock ratio value used to boot the processor is the same as the correct value stored in parameter store 310, then the processor has booted with the correct clock ratio value and control flow branches at step 410 to step 412 where control returns to the BIOS for completion of initialization of other processing within processor 100. If the clock ratio value used to boot the processor is not the same as the correct value stored in parameter store 310, then the processor moves on to step 414.

At step 414, the correct clock ratio value in parameter store 310 is written to GPIO register 291 for output to MUX 270 of FIG. 2. Because the default value is weakly established, writing the correct value to GPIO register 291 will override the default value present at clock configuration bits BF0–2. Processor 100 also clears the clock enable signal 294 to disable buffer 298 and inhibit the ISA reset signal 297 from resetting super I/O 290. This prevents the correct value resident in GPIO 291 from being cleared during a reset cycle.

Control flow then proceeds to step 416 where the processor initiates a reset cycle. A reset cycle can be generated in a number of ways. One typical way to obtain a software generated reset is for the processor to perform a write operation to a particular memory address that triggers a circuit that generates the reset signal. In FIG. 2, reset/clock generation circuit 210 is coupled, either directly or indirectly, to the control bus 230 and address bus 240 that are driven by processor 100. Processor 100 writes to an address that corresponds to the reset circuitry within circuit 210, such as a one-shot device, that will respond by generating the reset signal on connection 214.

Responsive to the reset event generated at step 416, control flow will then reenter method 400 at step 402. However, during this reset cycle, the correct clock ratio value is stored in GPIO register 291 and output to MUX 270. During the reset cycle, PCI bridge interface circuit 220 will activate /CRESET signal 272 which will cause MUX 270 to select the correct clock ratio value present on connection 292 from GPIO 291.

At this point, GPIO register 291 is driving the correct value onto connection 292, through MUX 270 onto connection 274 and clock configuration bits BF0–2. Consequently, when the process 400 is entered the second time, the value read at step 404 from the clock configuration bits BF0–2 is the correct value and the processor will have booted with the correct clock ratio value.

Using the method according to the present invention, it is possible to boot the processor with the correct clock ratio under software control. Thus, it is unnecessary to modify hardware, i.e. change resistor connections or switch settings, in order to update the clock ratio of the processor. The correct clock ratio value can be changed simply by updating the parameter store 310.

It should be understood that the programs, processes, methods, systems and apparatus described herein are not related or limited to any particular type of computer apparatus (hardware or software), unless indicated otherwise. Various types of general purpose or specialized. computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A method for configuring a clock ratio in a processor, the method comprising the steps:

responsive to reset of the processor, reading a first bit pattern present on clock ratio configuration pins of the processor;

booting the processor with a clock ratio corresponding to the bit pattern present on the clock ratio configuration pins;

comparing the clock ratio of the processor after booting to a desired clock ratio value from a non-volatile storage;

when the clock ratio of the processor after booting does not equal the correct clock ratio value, then writing the desired value to a register coupled to the clock ratio configuration pins of the processor and inhibiting reset of the register; and resetting the processor when the clock ratio of the processor after booting does not equal the desired clock ratio value.

2. A computer readable medium having stored therein instructions for causing a processing unit to execute the method of claim 1.

3. The method of claim 1, further including the step of updating the clock ratio of the processor by modifying the desired clock ratio value in non-volatile storage and resetting the processor.

4. A computer system architecture, the architecture comprising:

a processor having a clock ratio configuration input terminal for receiving a clock ratio configuration signal that determines a clock ratio of the processor, a clock input terminal for receiving a clock signal, a reset input terminal for receiving a reset signal, an address bus and a data bus;

a register having a data input terminal coupled to the data bus, a data output terminal coupled to the clock ratio configuration input terminal, an enable input configured to be selected by a first predetermined value present on the address bus;

a first non-volatile store having input and output terminals coupled to the data bus and an enable input configured to be selected by a second predetermined value present on the address bus; and a second non-volatile store having input and output terminals coupled to the data bus and an address input terminal coupled to the address bus, the second non-volatile store having a set of processor readable instructions configured to drive the processor to:

read a value present at the clock configuration input terminal of the processor;

set the clock ratio of the processor to a first clock ratio value corresponding to the value at the clock ratio configuration input terminal, compare the clock ratio of the processor to a value stored in the first non-volatile storage, complete boot initialization of the processor when the clock ratio of the processor matches the value stored in the first non-volatile storage, and write the value stored in the first non-volatile storage to the register when the clock ratio of the processor does not match the value stored in the first non-volatile storage and generate the reset signal;

where the processor is further configured to execute the processor readable instructions of the second non-volatile store responsive to receiving the reset signal at the reset input terminal.

5. The architecture of claim 4, where the register includes a reset terminal coupled to the output terminal of the buffer and the architecture further includes:

a buffer having an input terminal for receiving the reset signal, an output terminal, and a control terminal;

a second register having a data input terminal coupled to the data bus, a data output terminal coupled to the control terminal of the buffer, an enable input configured to be selected by a third predetermined value present on the address bus. and a reset terminal coupled to the output terminal of the buffer; and the second non-volatile memory includes an instruction configured to write a value to the second register, when the clock ratio of the processor does not match the value stored in the first non-volatile storage, that disables the buffer.

6. The architecture of claim 4, where the clock configuration input terminal is driven with a weak default value.

7. The architecture of claim 4, further including a user interface coupled to the processor, whereby a user can update the value stored in the first non-volatile storage through the processor.

8. A processor system, the processor system comprising:

means for setting a clock ratio of the processor, responsive to reset of the processor, to a value corresponding to a bit pattern present on a clock ratio configuration input of the processor;

means for booting the processor with the clock ratio;

means for comparing the clock ratio to a correct value stored in a non-volatile store;

to means for completing booting of the processor when the clock ratio matches the correct value stored in the non-volatile store; and means for writing the correct value to a register for output to the clock ratio configuration input of the processor when the clock ratio does not match the correct value and resetting the processor.

9. The system of claim 8, further including means for inhibiting reset of the register when the clock ratio does not match the correct value.

10. The system of claim 8, further including means for updating the correct value in the non-volatile store.

* * * * *